METHOD AND SYSTEM FOR PRODUCING AND VIEWING COLOR STEREOSCOPIC IMAGES

Filed Sept. 15, 1961

INVENTORS
Edwin H. Land
and
Nigel W. Daw
BY
Brown and Mikulka
Attorneys

United States Patent Office 3,256,776
Patented June 21, 1966

3,256,776
METHOD AND SYSTEM FOR PRODUCING AND VIEWING COLOR STEREOSCOPIC IMAGES

Edwin H. Land and Nigel W. Daw, both of Cambridge, Mass., assignors to Polaroid Corporation, Cambridge, Mass., a corporation of Delaware Filed Sept. 15, 1961, Ser. No. 138,343
4 Claims. (Cl. 88—29)

Figure 1:
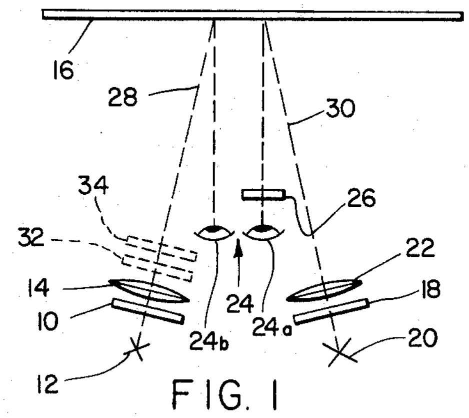

This invention relates to the formation of composite images and more particularly to novel methods and systems for producing and viewing stereoscopic images, either in black-and-white or in color.

The present invention involves several striking and advantageous departures from conventional methods of forming and viewing images, in particular stereoscopic images. It also embodies a novel and useful concept of color imagery.

The invention includes a method of forming images for a stereoscopic system by which four components can be distributed between the two eyes so as to give the effect of a six component system. This follows from the discovery that by employing a proper balance between left- and right-eye image brightnesses, and that by insuring that the densities in which a given object are rendered in left- and right-eye images, respectively, are essentially the same, retinal rivalry is eliminated, a three-dimensional picture is seen, and the colors seen are more saturated than an ordinary mixture of the colors seen by the two eyes would be. "Densities," in the sense here intended, relates to a reading of a densitometer for a given object as compared to that for a white object, the densitometer being corrected for the luminosity curve of the eye. One particular embodiment of the invention utilizes three color-separation components viewed by one eye and one black-and-white component viewed by the other eye. Another utilizes two color-separation components viewed by one eye and two color-separation components viewed by the other.

Thus it is a significant finding of the present invention, and one having practical application in certain of the systems described herein, especially with respect to stereoscopic systems thus described, that all of the color information of a composite image, having both color and black-and-white image components, can be perceived by one eye of the viewer only, while the other eye perceives substantially exclusively the non-colored image components. Employing the foregoing phenomenon, the composite image, when viewed binocularly, appears practically identical in hue to one in which the complete color ingredients are contained in both the left- and right-eye image components.

In accordance with the foregoing considerations, objects of the invention are to provide improved stereoscopic methods and systems from the point of view of an enlarged utility, taken with aspects of greater simplicity and economy; to provide novel and improved methods and systems of forming multicolor images; to provide stereoscopic multicolor images through novel additive or subtractive methods and devices; and to provide methods and systems of the character described which are adapted either to front or rear image projection, including television, and to the production of direct viewing adaptations including both transparencies and reflection prints.

Other objects of the invention will in part be obvious and will in part appear hereinafter.

The invention accordingly comprises the processes and systems involving the several steps and the relation and order of one or more of such steps with respect to each of the others which are exemplified in the following detailed disclosure, and the scope of the application of which will be indicated in the claims.

Figure 4:
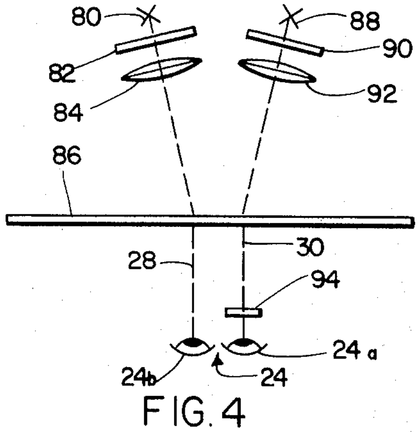
Figure 5:
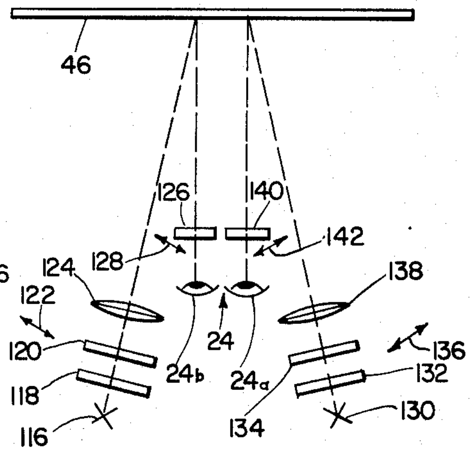
Figure 6:
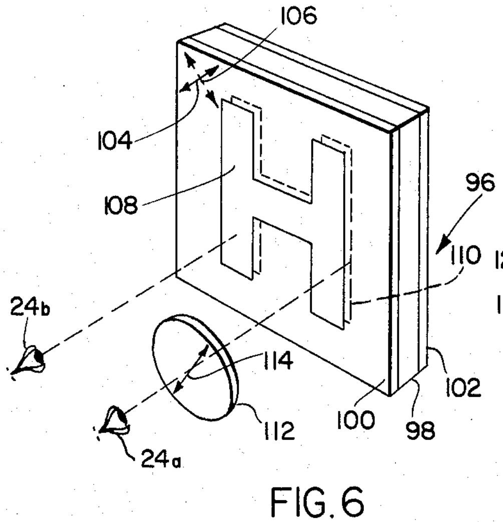

For a fuller understanding of the nature and objects of the invention, reference should be had to the following detailed description taken in connection with the accompanying drawing wherein:

FIGURES 1 through 5 are diagrammatic views of projection systems of the invention; and FIGURE 6 is a diagrammatic perspective view of a composite print further exemplifying the invention.

Referring to FIG. 1, there is shown one embodiment of the invention in which a transparency 10 is projected by light-source means 12 and lens means 14 onto a screen 16 and a second and different transparency 18 is similarly projected by light-source means 20 and lens means 22. The images are viewed at 24, a filter, e.g., a monocle 26, worn by the viewer being located in the path of reflected light rays identified with transparency 18. While tthe optical axes 28 and 30 of the two projection devices are shown quite widely spaced at their points of incidence upon screen 16, it is to be understood that, actually, the images would generally be substantially superimposed in producing a non-stereoscopic image deriving color components from each transparency, and would be offset laterally, but to a lesser degree, relatively, than that shown, in the instance of a stereoscopic system where transparencies 10 and 18 are left- and right-eye stereoscopic images, respectively. The exaggerated lateral displacement of the optical axes at screen 16, as well as the directions thereof from the screen to the eyes of the viewer at 24, shown in FIGS. 1 through 4 are not intended to designate the paths of image-forming light rays but are primarily for the purpose of providing a distinct separation of the two paths of light so that a viewing filter or filters can be included in one or both paths for illustrative purposes. It is, of course, evident that such additional components, not shown, as reflectors, condensing lenses, and additional objective elements etc., would be included in the system for image-forming purposes.

Assuming FIG. 1 to represent a stereoscopic system, in one embodiment thereof, transparency 10 comprises a left-eye full-color image, formed, for example, of cyan, magenta and yellow color-separation image components operating subtractively to provide a multicolor image, or of red, green, and blue screen components operating additively. Alternatively, element 10 may represent a single color-separation transparency, e.g., the red color-separation record used with a red filter 32, the green and blue records having associated green and blue filters, not shown, being separately projected from individual projectors, also not shown. Element 12 is a source of substantially white light or white light minus light of the sodium band. Transparency 18 is a right-eye black-and-white image projected by illumination means which is dark relative to the illumination provided along axis 28 and element 20 is a sodium light source. The viewing element 26 is a narrow band, yellow filter or monocle. Assuming the color transparency 10 to be composed of color components, e.g., red, green and blue, color components, so chosen as to their composition as not to pass sodium light, and viewing filter 26 to be a narrow band, yellow filter, the right eye **24*a* sees only the right-eye projection image of the black-and-white transparency 18. Simultaneously, the left eye sees substantially only the left-eye projection image of the color transparency 18** by reason of the chosen relative darkness of illumination of the black-and-white image which effectively "disappears" when viewed in superimposed relation with the color image for lack of contrast with the latter. One special advantage of this system derives from the fact that when the eye focuses on a full-color picture, it focuses essentially at the same place it would when viewing a picture in yellow light. Consequently, in the foregoing system, the eye viewing the full-color picture and the eye viewing the picture in sodium light are both essentially at the same focus. A satisfactory ratio of brightnesses, between the black-and-white and color image components, is provided when the black-and-white image component is accorded approximately 5 to 30% of the brightness of the color image component or components.

Further referring to FIG. 1, where certain color components of the left-eye transparency 10 might, undesirably, be visible through the narrow-band, yellow, right-eye viewing filter 26, depending upon the width of the band of the latter, a filter 34 such as one containing a didymium compound adapted to absorb light of the sodium line portions of the spectrum is introduced in the projection path of the optical axis 28 to prevent perception of said color components of the right eye. Appropriate filters for the purpose are No. 1–60 or No. 1–63 didymium filters manufactured by Corning Glass Works, Corning, New York, U.S.A. Filter 26 is chosen to pass light of approximately 589 millimicrons. When filter 26 is removed from its functional position, a two-dimensional multicolor image of transparency 10 is seen, the relatively dark image of transparency 18 being substantially invisible against the multicolored image.

As will be apparent, the system of FIG. 1 is not limited to a stereoscopic function, it being adapted to any use where it may be desirable to render components of light selectively visible to each eye of the viewer as, for example, to restrict the visibility of color components of a multicolored image to one eye of the viewer while a neutral-toned component thereof is limited in visibility to the other eye. In a modification of the system of FIG. 1, the light source 12 may be chosen to produce light of the visible spectrum exclusive of the ends, and the light source 20 to produce light at the red and blue ends of the spectrum. In such an instance, filter 26 would be of a magenta color.

Figure 2:
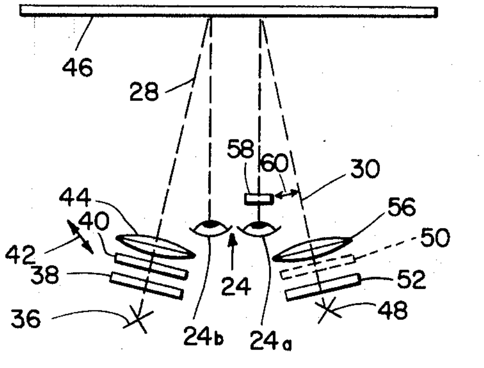

A further modification of the system, above described, and employing light-polarizing means for image selection purposes, is shown in FIG. 2. It comprises a substantially white light source 36, a left-eye full-color transparency 38, a light-polarizing filter 40 having a polarizing direction 42, a projection lens or objective 44, a non-depolarizing screen 46, a light source 48 producing, of itself or in conjunction with a neutral density filter 50, relatively dark illumination, a right-eye black-and-white transparency 52, an objective 56, and a light-polarizing monocular filter or analyzer 58 having a polarizing direction 60 located adjacent to the right eye **24*a*** of the viewer.

In operation, the right eye **24*a* sees the image of transparency 52 substantially exclusively by reason of the crossed relationship of polarizing axes 42 and 60. The left eye sees only the multicolored image of transparency 38 because of the relatively dark illumination provided along axis 30 whereby the image of transparency 52 is substantially invisible against the multicolored image. Filter 58 may be removed from its functional position enabling the viewer to see a two-dimensional multicolored image. The transparency 38 may be in any of the alternative color-providing forms described hereinbefore relative to FIG. 1. It may also, of itself, be a light-polarizing image such as one rendered in a dichroic dye and printed on a molecularly oriented film, thus obviating the need for the separate polarizing element 40**.

Figure 3:
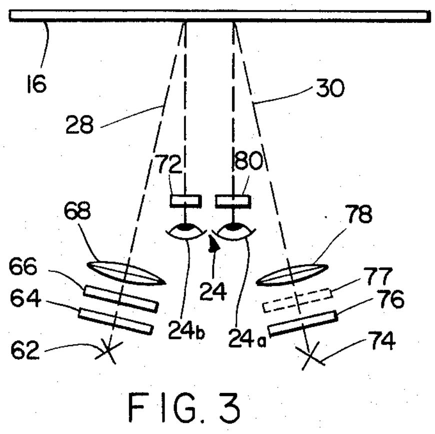

In FIG. 3, there is illustarted a stereoscopic system comprising a source of substantially white light exclusive of that of the sodium band 62, a left-eye full-color transparency 64, a didymium filter 66, an objective 68, a projection screen 16, a left-eye didymium viewing filter 72, a source of sodium light 74, a right-eye black-and-white transparency 76, an objective 78, and a right-eye, narrow band, yellow viewing filter 80. The multicolor image is carried on one band, namely, substantially the visible spectrum exclusive of light of the sodium line, and the black-and-white image is carried on another band, that is, by sodium light. The didymium viewing filter 72 passes the multicolor image light rays from transparency 64 but blocks those from the source of sodium light 74. The narrow band, yellow viewing filter 80 passes the black-and-white image light rays but blocks those from light source 62. Alternatively, a filter 77 adapted to pass the ends of the visible spectrum could be provided and filter 80 modified for a similar purpose. Light source 74 would then be of a type to provide energy for these regions of the spectrum. In accordance therewith, filters 66 and 72 would be modified to pass substantially the entire visible spectrum exclusive of the aforesaid ends.

The system of FIG. 4 illustrates one adapted to the formation of images of the character previously described and, assuming a stereoscopic function, it comprises rear projection means including a source of substantially white light 80, a left-eye full-color transparency 82, an objective 84, a light-transmitting projection screen 86, a source of sodium light 88, a right-eye black-and-white transparency 90 projected by relatively dark illumination, as previously described, and an objective 92. A monocular viewing element 94 in the form of a narrow band, yellow filter is positioned in front of the right eye **24*a*, the left eye 24*b* having no filter means in front of it. This system functions in a manner generally similar to that shown in FIGURE 1, it being possible to include filters such as 32 and 34 in an optical path of projection 28** of the color image, as previously described.

In FIG. 5, there is shown a light-polarizing stereoscopic system comprising a substantially, white light source 116, a left-eye full-color transparency 118, a light polarizing filter 120 having a polarizing direction 122, an objective 124, a non-depolarizing screen 46, a left-eye viewing filter or analyzer 126 having a polarizing direction 128, a light source 130, a right-eye black-and-white transparency 132, a light-polarizing filter 134 having a polarizing direction 136, an objective 138, and a right-eye viewing filter 140 having a polarizing direction 142. In operation, the right eye **24*a* sees the image of transparency 132 substantially exclusively because of the parallel relation of polarizing axes 136 and 142 and the crossed relation of polarizing axes 122 and 142. The left eye 24*b* sees the image of transparency 118 substantially exclusively because of the parallel relation of polarizing axes 122 and 128 and the crossed relation of polarizing axes 136 and 128**.

The present invention is further adapted to embodiment in transparencies or reflection prints for direct viewing. One such adaptation employing light-polarizing components is shown in the composite print 96 of FIG. 6. As shown, the structure appears of appreciable thickness but actually it may be a relatively thin sheet having, for example, an overall thickness of as little as .005″. Assuming the print to be in the form of a transparency, it comprises a central light-transmitting support layer 98, a front layer 100 of a material adapted to the rendered light polarizing, such as a molecularly oriented hydroxyl-containing vinyl polymer bonded to the front surface of support layer 98, and a rear layer 102 of a similar material but molecularly oriented substantially at 90° relative to the front layer. Rear layer 102 is bonded to the rear surface of central layer 98. The light-polarizing directions of layers 100 and 102, when treated with a proper dye, stain or the like, such as a dichroic direct cotton dye, are indicated by the double-headed arrows 104 and 106, respectively. A full-color light-polarizing, left-eye stereoscopic image 108 of the general type described in U.S. Patent No. 2,289,714 and having the polarizing direction 104 is printed in proper dichroic dyes on the front layer 100. A black-and-white light-polarizing, right-eye stereoscopic image 110 of the general type described in U.S. Patent No. 2,373,035 and having the polarizing direction 106 is printed in a dichroic dye or stain on the rear layer 102. A monocular light-polarizing filter or anlyzer 112 having the polarizing direction 114 is positioned in front of the right eye 24*a*, the left eye 24*b* having no filter. In operation, the right eye sees only the rear black-and-white image 110 having a crossed relation of its polarizing axis. The left eye sees only the front full-color image 108 because the black-and-white image 110 is rendered in a brightness range such that it is substantially invisible against the full color image 108. With filter 114 removed, both eyes see only the full-color image for a similar reason. By employing a non-depolarizing reflecting layer at the rear of layer 102, a reflection print is provided. If it is desired to provide a print of the type of FIG. 6 incorporating balanced brightnesses of left- and right-eye images, a second viewing filter, having a polarizing direction at 90° to that of filter 112, may be positioned in front of the left eye 24*b*.

Another form of print employing an additive screen and exemplifying the principles described herein comprises a full-color left-eye stereoscopic image formed in a first set or mosaic of red, green and blue screen components and a "black-and-white" right-eye stereoscopic image formed in a second set or mosiac of yellow screen components interspersed with the first set. The second set of screen components is designed to pass a narrow band of yellow wavelengths and to absorb all other wavelength. The first set of screen components is designed to absorb at least 80% of the narrow band of yellow wavelenths passed by the second set of screen components. The "black-and-white" image is taken in such a way that the density of each object is the same in the "black-and-white" image as in the color image, such densities being defined as above. The viewer employs a narrow band, yellow filter over the right eye and a filter which blocks this band of wavelengths, such as a didymium filter, over the left eye. Alternatively, the yellow components of the screen may be such as to pass much less light than the other components. In this case the viewer will see substantially only the colored image emanating from the red, green and blue elements of the screen if the didymium filter is dispensed with, and this may be done.

In an alternative embodiment of this screen technique the full color image is formed of red, green and blue elements which do not pass the ends of the spectrum, the "black-and-white" image is formed of elements which do pass the ends of the spectrum, and the viewer uses filters which pass, respectively, the whole spectrum apart from the ends, and the ends of the spectrum only.

Several television adaptations of the stereoscopic methods described herein are possible. Thus, for example, the left- and right-eye images may be picked up, transmitted on individual channels, and reproduced on individual sets of phosphors of the target screen of the receiver picture tube. The principles hereinbefore described may be exemplified in a light-polarizing television system, for example, by super-imposing a light-polarizing screen, or screens, with one or a plurality, respectively, of sets of phosphors and employing therewith monocular or binocular viewing means of the character hereinbefore described.

In another television adaptation, the sets of phosphor luminescing in response to electron impingement derived from the left-eye signal may, for example, provide, additively, the full-color ingredients of a multicolored image while the right-eye signal excites luminescence of a set of phosphors producing substantially white light. The phosphor set reproducing the right-eye image is chosen to emit light of a narrow band of yellow wavelength, while the set of phosphors reproducing the left-eye image is chosen to emit light in other regions of the visible spectrum. A right-eye narrow band, yellow filter, passing light of the yellow wavelengths, and a left-eye didymium filter, passing the left-eye colors and blocking the yellow wavelengths, are employed, respectively, therewith for viewing purposes. Other television adaptations employing the principles of multicolor imagery and stereoscopic function described herein will be apparent to one skilled in the art and are deemed to fall within the scope of the present invention.

Where plane light-polarizing means have been shown herein, it is to be understood that circularly light-polarizing means, such as filters, may be employed in combination in a manner known to the art in their stead.

To obtain a proper balance of densities of left- and right-eye images using projection and viewing means of the type hereinbefore described and the technique of separately projecting three left-eye color-separation prints, with associated red, green and blue filters to superimposition on a screen and a black-and-white right-eye transparency to proper registration therewith, the following preliminary operations were performed. In making the right-eye color-separation transparency exposure was for an amount equal to one-sixth of that of the left-eye red and two-fifths of the left-eye green color-separation transparencies and one-sixteenth that of the left-eye blue transparency. In projection, it was found that a similar exposure for both left- and right-eye transparencies resulted in retinal rivalry, e.g., with respect to blue objects in the image, using a material with a spectral sensitivity commonly employed. It appeared that the contribution of the blue light to the black-and-white image required diminution. Using a common panchromatic emulsion in conjunction with two Wratten color compensating filters, CC50Y, and one Wratten color compensating filter 30C substantially prevented retinal rivalry. It was also observed that the colors of the composite image, seen by both eyes, seemed to be less saturated than those of the image of the color transparency, when viewed by itself, but more saturated than those of the superimposed color and black-and-white images when viewed by either eye, alone. For best results, it was ascertained that the color transparency should be slightly brighter than the black-and-white transparency and slightly brighter and more saturated than reality. This was achieved by using narrow band interference filters in producing the color-separation prints for the left-eye. In a color process this substantially corresponds to providing sharp peaks of sensitization of emulsions or to exaggerating the undercuts of a substractive process.

Further referring to the production of full-color stereoscopic images and the reduction of retinal rivalry through methods of the present invention, some latitude is possible within the scope thereof in allocating the color and black-and-white components to the respective left- and right-eye images provided the image for one eye is dark with respect to the image for the other eye and the densities of like objects in both images are substantially similar. Thus, for example, a left-eye transparency may embody two or more color components and an associated right-eye transparency one or more color components. One such arrangement comprises a two-color component image of the left-eye transparency and a different two-color component image of the right-eye transparency.

Where left- and right-eye images have been described herein as identified with certain stated light sources, filters, color-providing means, etc. it will be understood that they can be reversed in their association therewith. Thus, for example, where the full-color image has generally been described as associated with the left-eye and associated elements and the black-and-white image with the right-eye, an opposite arrangement may, of course, be the case without affecting the operation of the system.

Wherein means such as light polarizers, special light source means, filters, etc., have been described herein for rendering the left- and right-eye images individually perceptible, it is to be understood that such features of the invention as incorporating the color components in an image to be viewed by one eye only and the black-and-white component in an image to be viewed exclusively by the other eye are adapted to be included in entirely separate images to be viewed on a stereoscopic viewer of a classic type, incorporating a septum or the like to separate the images. Although separate projection means are shown for projecting left- and right-eye images, it will be understood that a single projector having beam-splitting means may, alternatively, be used for mounting and projecting separate transparencies. Where the terminology "black-and-white" has been used herein, it is intended to include an image formed in a monochromatic medium or color as, for example, one formed in sodium light.

Since certain changes may be made in the foregoing methods and systems without departing from the scope of the invention herein involved, it is intended that all matter contained in the above description or shown in the accompanying drawing shall be interpreted as illustrative and not in a limiting sense.

What is claimed is:

1. In combination, a stereoscopic composite picture visible as a multi-colored three-dimensional image, comprising, in stereoscopic positional relation, a substantially full-color image of a multicolored photographic subject which is representative of the selective photographic exposure to, and color-separation recording of, the several colored portions of said subject taken from one position, in substantially superimposed relation with said full-color image a black-and-white image of the subject which is representative of photographic exposure to, and recording of, substantially the entire content of said subject taken from a second position, but at given fractions of said selective exposure so that like portions of both said images are of balanced densities for reducing retinal rivalry, and discriminatory viewing means for rendering said images individually visible to the separate eyes of the viewer to provide said three-dimensional image.

2. A method of producing a visible multicolored stereoscopic image of a photographic subject which both accurately reproduces the colors of said subject and contributes to the elimination of retinal rivalry, said method comprising the steps of forming on an image-receptive surface a multicolored first image of a stereoscopic pair of images, said image being composed of a plurality of image components which are rendered in a plurality of colors and various given densities as determined by a plurality of given color-separation means employed at a taking stage of their preparation, forming on an image-receptive surface and in substantially superimposed relation with said first image a second image of said stereoscopic pair, said second image comprising image components stereoscopically related to those of said first image but rendered only in black-and-white and in densities which have been so provided as to be generally identical to those of like components of said first image as determined by a plurality of given color-separation means employed at a taking stage of their preparation providing predetermined fractional exposures of those obtained by said first-named color separation means and making each of said images exclusively visible to but one of the eyes of the viewer by introducing discriminatory light-filtering means of given characteristics into the paths of light rays identified with said stereoscopic pair of images.

3. A system for forming and viewing a composite image perceptible as a full-colored stereoscopic representation of a photographic subject comprising:

means for forming a visible polychromatic first image component rendered in a range of densities and hues and perceptible as a substantially full-colored representation of said subject, means for forming a second image component stereoscopically related to said first image component in visible light conveying no color information with respect to said subject but rendered in a range of densities similar to those of said first image component, the densities of like object areas in both image components being substantially the same, and means for presenting each of said image components simultaneously to repectively separate eyes of an observer.

4. A system for forming and viewing a composite image perceptible as a full-colored stereoscopic representation of a photographic subject comprising:

means for forming at an image plane a visible polychromatic and substantially full-colored first image component rendered in a range of densities and hues, means for forming at said image plane in superimposed relationship to said first image component a visible substantially single-hued second image component stereoscopically related to said first image component and rendered in a range of densities similar to that of said first image component, the densities of like object areas in both image components being substantially the same, and light-filtering viewing means for making each of said image components visible exclusively to respectively separate eyes of a viewer.

References Cited by the Examiner

UNITED STATES PATENTS

| | | |
|---|---|---|
| 2,136,303 | 11/1938 | Lumiere. |
| 2,217,907 | 10/1940 | Kampfer et al. |
| 2,289,714 | 7/1942 | Land. |
| 2,530,023 | 11/1950 | Millais. |
| 2,854,335 | 9/1958 | Mahler. |

FOREIGN PATENTS

| | | |
|---|---|---|
| 781,200 | 2/1935 | France. |
| 660,994 | 11/1951 | Great Britain. |
| 694,339 | 7/1953 | Great Britain. |

DAVID H. RUBIN, *Primary Examiner.*

JEWELL H. PEDERSEN, *Examiner.*

D. J. HOFFMAN, *Assistant Examiner.*